United States Patent
Engel

[15] 3,665,145
[45] May 23, 1972

[54] RESISTANCE WELDING ELECTRODE
[72] Inventor: Harold J. Engel, 8127 Matilya Ave., Panorama City, Calif. 91402
[22] Filed: Apr. 10, 1970
[21] Appl. No.: 27,398

[52] U.S. Cl..............................................219/119, 219/137
[51] Int. Cl................................................................B23k 9/24
[58] Field of Search..........................................219/119, 120

[56] References Cited

UNITED STATES PATENTS 3,525,848   8/1970   Bugaj......................................219/119
3,478,189   11/1969  Estes...................................219/119 X

*Primary Examiner*—J.V. Truhe
*Assistant Examiner*—George A. Montanye
*Attorney*—Nilsson, Robbins, Wills & Berliner

[57] ABSTRACT

The useful life of a resistance welding copper electrode is significantly extended by plating on its tip a material having certain defined parameters and exemplified by nickel, berylium, cobalt and iron.

10 Claims, 2 Drawing Figures

Patented May 23, 1972

3,665,145

INVENTOR.
HAROLD J. ENGEL.
BY
Nilsson, Robbins, Wills & Berliner
Attorneys.

RESISTANCE WELDING ELECTRODE

FIELD OF THE INVENTION

The field of art to which the invention pertains includes the field of electrodes, particularly resistance welding electrodes.

BACKGROUND AND SUMMARY OF THE INVENTION

In resistance welding, electrodes are utilized to convey current to two pieces of metal to be joined. Because of its high electrical conductivity and availability, these electrodes are typically made of copper or copper alloys. Sufficiently large currents are passed through the metal between the electrodes to raise the metal to its melting point, causing diffusion of the metals to occur effecting a bond therebetween. The process is used industrially in several forms including spot welding, seam, stitch and roller welding which are closely related to spot welding, projection welding, resistance butt welding and flash butt welding. These methods involve relative movement of the metal pieces or movement of the joint with respect to one or more of the electrodes and the establishment of a potential gradient across the electrodes whereby current is passed through the pieces. Another related process is capacitive discharge welding in which a potential gradient sufficient to effect welding of the metal pieces is established by discharge of a capacitor and the current flowing through the weld is determined by the amount of charge capacitively stored, rather than by the intrinsic resistance of the pieces. In this regard, when the term "resistance welding" is utilized herein it is meant to include capacitive discharge welding as well as the other forms of resistance welding mentioned hereinabove.

In each of the foregoing processes, it is found that after a short period of operation, electrode sticking occurs and the electrodes must be mechanically abraided and/or chemically cleaned to enable its further use. This problem is particularly severe when welding metals having a surface component of a metal of lower melting point than the copper electrode, e.g., aluminum and zinc. For example, in a typical spot welding operation of galvanized steel sheet, after 10 minutes of operation in which 84 spot welds were effected with a copper electrode, operation had to be stopped to replace the electrodes as sticking prevented further effective use thereof. Prior art attempts to overcome such sticking have included the provision of tips thereon as disclosed in U.S. Pat. No. 2,795,688 to D. J. McCaffrey and in U.S. Pat. No. 3,363,086 to R. C. Ecklund et al. However, these attempts did not recognize certain material characteristics as will be amplified on below.

In accordance with the present invention, it is theorized that such sticking may occur as a result of a diffusion of the metal to be welded into the surface of the electrode. After a sufficient amount of operation, the amount of diffused metal is sufficient to cause electrode sticking. The present invention provides means for overcoming such effects by applying to the electrode a barrier against such diffusion. Specifically, the present invention provides a resistance welding electrode of copper or high melting alloy thereof having an outer tip surface defined by material plated thereon, such material having certain defined properties and exemplified by nickel, berylium, cobalt, iron, and high melting point alloys thereof (at least 1,083° C). In terms of specific properties, the materials should have a melting point of at least 1,083° C, a coefficient of linear expansion of $16.4 \pm 5.0 \times 10^{-6}$ inch/inch/°C over the range 20°–100° C, an electrical conductivity of at least 15 percent IACS, a temperature coefficient of electrical resistance of less than 0.01/°C, and a thermal conductivity of at least 0.10 calories/cm/cm²/sec/°C. Importantly, the material is plated onto the electrode rather than merely being deposited by brazing or other such processes, and such plating is to a thickness of from about 0.0001 to about 0.01 inches. Advantageously, electroless plating methods can be utilized when appropriate. The electrodes of this invention are particularly advantageous when utilized to weld metals having a surface component of aluminum or zinc or other metal of a melting point lower than or equal to the copper electrode, e.g., copper itself.

DETAILED DESCRIPTION

As required, detailed embodiments of the invention are disclosed herein. However, it is to be understood that these embodiments in many aspects merely exemplify the invention which may be utilized in forms which are different from the specific illustrative embodiments disclosed. For example, while the method of welding illustrated herein is a spot welding process, the invention is applicable to other resistance welding methods as previously referred to including capacitive methods.

Figure 1:
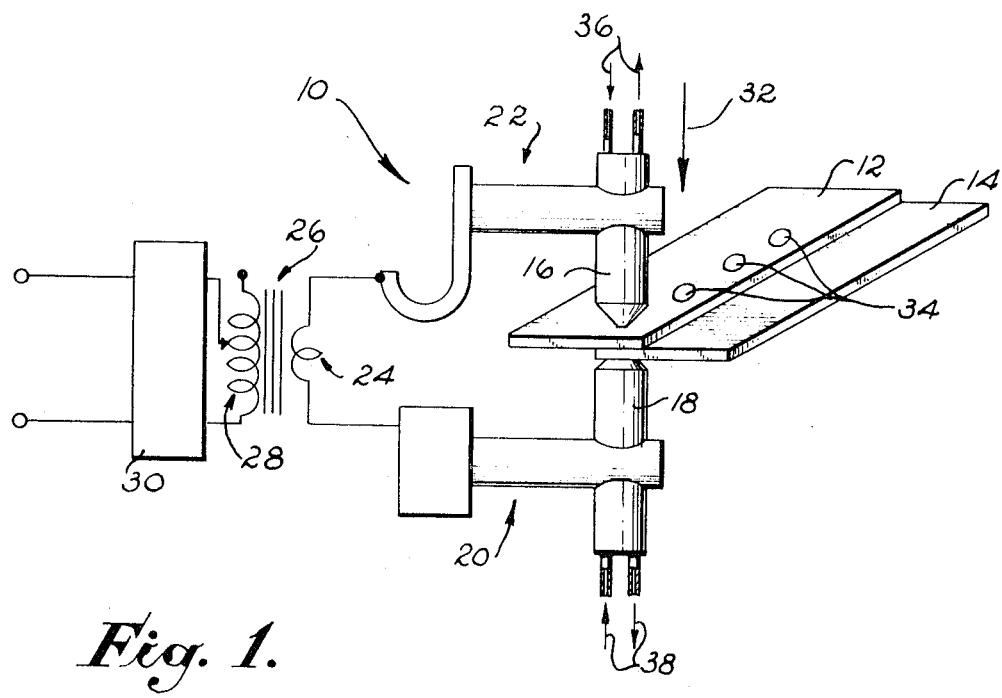
FIG. 1 is a schematic illustration of components utilized in an electric-resistance spot welding process.

Referring now to FIG. 1, there is schematically illustrated the basic components of a conventional spot welding machine 10 which may be used for spot welding aluminum sheets 12 and 14, galvanized steel sheets or the like. A pair of resistance welding electrodes 16 and 18 are disposed so as to be situated on opposite sides of the seam between the metal sheets 12 and 14 to be joined. One of the electrodes 18 is carried by a horn 22 which is movable on a vertical plane with respect to the fixed horn 20. The horns 20 and 22 are connected to the secondary wiring turns 24 of a transformer 26, the primary turns 28 of which are connected through a timer 30 to a source of alternating current. In operation, the electrode 16 is carried downwardly by the movable horn 22, as indicated by the arrow 32 to sandwich the metal sheets 12 and 14 whereupon the timer 30 supplies current to the transformer 26 which in turn provides current to the electrodes 16 and 18 to effect a flow of current through the metal sheets 12 and 14 at the point of securement between the electrodes 16 and 18. As a result of the flow of current, the metal sheets 12 and 14 are locally heated whereby the contacting surfaces thereof melt and interfuse to form a weld, as illustrated by the completed welds 34. Means are provided for supplying cooling water internally of the electrodes 16 and 18 as indicated by the arrows 36 and 38.

Figure 2:
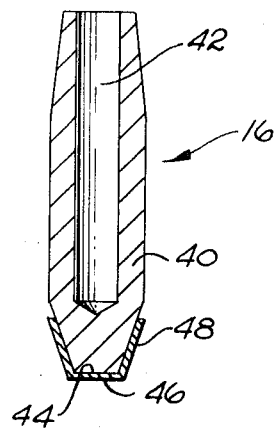
FIG. 2 is a longitudinal sectional view taken through one of the electrodes of the present invention.

Referring now to FIG. 2, there is illustrated an electrode 16 which can be utilized in accordance with the improvement of the present invention. The electrode 16 comprises a body 40 of copper of about ⅝ inch diameter and of conventional construction, including a passageway 42 into the body through which a cooling medium such as water may circulate, as indicated above. In accordance with the present invention, the outer tip portion surface 44 of the electrode 16 has plated thereon a material 46 having certain characteristics as will be defined hereinafter. The material 46 is plated to a thickness of from about 0.0001 to about 0.01 inches and defines the contact surface of the electrode 16. The plated material 46 can extend along the sides of the electrode 16 as indicated at 48, as a result of the plating method utilized, but is important only that the contact surface be defined by the material 46.

The nature of the material 46 is very important as is the manner of deposition. The material 46 should be plated onto the surface 44, either electrically or by electroless deposition. Methods for accomplishing such plated surfaces are well known to the art. In accordance with this invention, it is desirable that the material 46 have good electrical and thermal conductivity. It is particularly desirable that the material 46 have a coefficient of linear expansion which is of similar magnitude to the coefficient of linear expansion of copper and this is particularly important where the electrode is utilized with the application of a mechanical force, as in spot welding. In accordance with the foregoing, the material 46 should have a thermal conductivity of at least 0.10 calories/cm²/sec/°C. The following Table 1 lists a variety of metals having a melting point greater than that of copper in the order of decreasing thermal conductivity.

TABLE 1

| Metal | Thermal Conductivity, calories/cm./cm.²/sec./° C. |
| --- | --- |
| W | 0.40 |
| Rh | 0.36 |
| Be | 0.35 |
| Ir | 0.35 |
| Mo | 0.35 |
| Os | 0.22 |
| Fe | 0.18 |
| Co | 0.17 |
| Pd | 0.17 |
| Pt | 0.17 |
| Re | 0.17 |
| Re | 0.17 |
| Ni | 0.15 |
| Nb | 0.13 |
| Ta | 0.13 |
| Th | 0.09 |
| V | 0.07 |
| U | 0.06 |
| Ti | 0.04 |
| Zr | 0.04 |

It will be apparent from Table 1 that metals such as thorium, vanadium, uranium, titanium, and zirconium are excluded on the basis of the criterion set forth above.

The material should have an electrical conductivity of at least 15 percent IACS (International Annealed Conductivity Standard, copper = 100 percent) and a temperature coefficient of electrical resistance of less than 0.01/°C. The following Table 2 lists a variety of metals in order of decreasing electrical conductivity and also lists the temperature coefficient of electrical resistance of the metals.

TABLE 2

| Metal | Electrical Conductivity, % IACS | Temp. Coefficient of Resistance Electrical/° C. |
| --- | --- | --- |
| Be | 38.9–45.1 | 0.006 |
| Rh | 40.0 | 0.005 |
| Mo | 34.0 | 0.004 |
| Ir | 32.0 | 0.004 |
| W | 31.0 | 0.005 |
| Co | 27.6 | 0.005 |
| Ni | 26.0 | 0.007 |
| Fe | 19.0 | 0.006 |
| Os | 19.0 | 0.007 |
| Pt | 18.0 | 0.004 |
| Pd | 16.0 | 0.038 |
| Th | 14.0 | 0.004 |
| Ta | 13.9 | 0.003 |
| Nb | 13.3 | 0.004 |
| Re | 8.5 | 0.003 |
| V | 7.0 | 0.003 |
| U | 6.0 | 0.003 |
| Zr | 4.0 | 0.004 |
| Ti | 3.0 | 0.003 |

On the basis of electrical conductivity, metals such as tantalum, columbium (niobium), and rhenium can be added to the foregoing list of excluded materials. On the basis of temperature coefficient of electrical resistance, palladium can be added to the list of excluded materials.

With respect to the expansion properties of the plated material 46, the material should have a coefficient of linear expansion of $16.4 \pm 5.0 \times 10^{-6}$ inch/inch/°C, over the range 20°–100°C. The following table lists a variety of metals in increasing order of coefficient of linear expansion.

TABLE 3

| Metal | Coefficient of Linear Expansion, $\times 10^{-6}$ in./in./° C. (20–100° C.) |
| --- | --- |
| W | 4.4 |
| Mo | 4.9 |
| Zr | 5.8 |
| Ir | 6.5 |
| Ta | 6.5 |
| Os | 6.6 |
| Re | 6.7 |
| Nb | 7.1 |
| V | 8.3 |
| Rh | 8.5 |
| Ti | 8.9 |
| Pt | 9.0 |
| Pd | 11.1 |
| Th | 11.1 |
| Fe | 12.2 |
| Co | 12.5 |
| Be | 13.0 |
| Ni | 13.1 |
| U | 19.0 |

From the foregoing Table 3, it can be seen that tungsten, molybdenum, iridium, osmium, rhodium and platinum can be added to the list of excluded metals in that they do not fall within the foregoing expansivity criteria.

In accordance with the foregoing, metals which can be plated onto the electrode 16 to constitute the outer surface 46 thereof are exemplified by nickel, berylium, cobalt, and iron. Additionally, high melting alloys of these metals can be utilized as well as alloys of other materials which have the foregoing properties. The following will further illustrate this invention.

EXAMPLE I

A copper welding electrode of conventional construction is secured to the movable horn of a 35 KVA spot welder. The welder is set on 10 cycles and galvanized steel sheet is welded with the electrode. The number of spot welds effected prior to sticking of the electrode was noted. The experiment was repeated six additional times. It was found that an average of 84 spot welds were effected prior to sticking of the electrode.

In accordance with this invention, an identical electrode was plated along the outer tip surface with nickel by an electroless plating technique utilizing well known prior art methods whereby nickel is deposited from a plating bath containing nickel acetate and sodium hypophosphite and complexing agents as appropriate. A solution which can be utilized and techniques for application of the plated nickel layer are well known to the art. Reference can be made to U.S. Pat. No. 3,282,723 to Melillo for specific details, the disclosure of which patent is incorporated herein by reference. Alternatively, the nickel can be electroplated onto the surface of the copper by any well known technique.

Utilizing the copper electrode having nickel electrolessly plated thereon, the experiment referred to above was repeated. After seven runs in which galvanized steel sheet was welded with the nickel-plated copper electrode until sticking, it was found that an average of 1,085 spot welds were effected before sticking required replacement of the electrode. This represents more than a 12 fold improvement in results.

In similar manner, copper electrodes can be plated with berylium, cobalt or iron and yield improved resistance to electrode sticking.

I claim:

1. In a resistance welding electrode of copper or high melting alloy thereof having an outer work-contacting tip portion thereof defined by material plated thereon in direct contact with the copper outer work-contacting tip portion of said electrode, the improvement comprising, said material being selected from the group consisting of nickel, cobalt, iron, and high melting point alloys thereof.

2. The invention according to claim 1 in which said material has a melting point of at least 1,083° C.

3. The invention according to claim 1 in which said material has a coefficient of linear expansion of 16.4± 5.0 × 10⁻⁶ inch/inch/°C over the range 20°–100° C.

4. The invention according to claim 1 in which said material has an electrical conductivity of at least 15 percent IACS, a temperature coefficient of electrical resistance of less than 0.01/°C and a thermal conductivity of at least 0.10 calories/cm/cm²/sec/°C.

5. The invention according to claim 1 in which said material is nickel.

6. The invention according to claim 1 in which said material is iron.

7. The invention according to claim 1 in which said material is plated onto said electrode to a thickness of about 0.0001–0.01 inch.

8. The invention according to claim 1 in which said material is cobalt.

9. In a method of resistance welding of material having a surface component of a metal of melting point lower than or equal to copper, the improvement which comprises using as an electrode a copper electrode having plated thereon on a work contacting tip portion of said electrode in direct contact with the copper of said electrode material selected from the group consisting of nickel, berylium, cobalt, iron, and high melting point alloys thereof.

10. In a method of resistance welding of material having a surface component of a metal of melting point lower than or equal to copper, the improvement which comprises using as an electrode a copper electrode having plated material thereon in direct contact with the copper of said electrode on the area of contact between the electrode and surface component, said plated material having a melting point of at least 1,083° C, a coefficient of linear expansion of 16.4± 5.0 × 10⁻⁶ inch/inch/° over the range 20°–100° C, an electrical conductivity of at least 15 percent IACS, a temperature coefficient of electrical resistance of less than 0.01/°C, and a thermal conductivity of at least 0.10 calories/cm/cm²/sec/°C.

* * * * *